Figure 3:
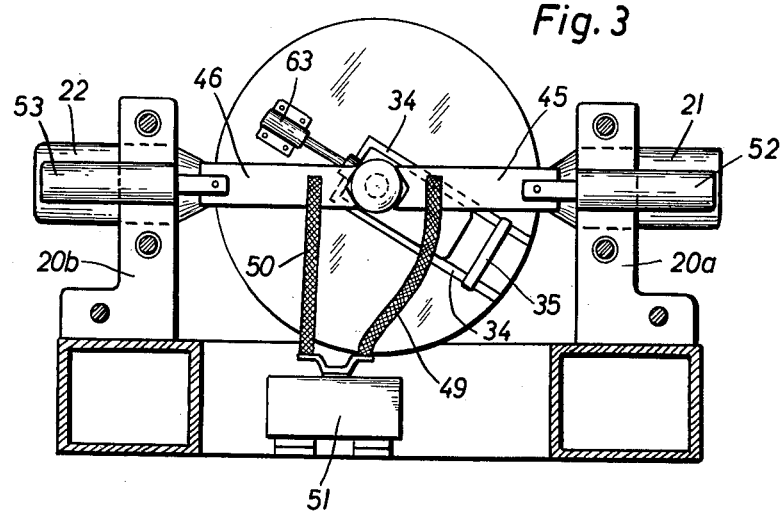

March 5, 1963  E. RIETSCH  3,080,471
ELECTRIC RESISTANCE BUTT WELDING MACHINE
Filed May 24, 1960  3 Sheets-Sheet 1
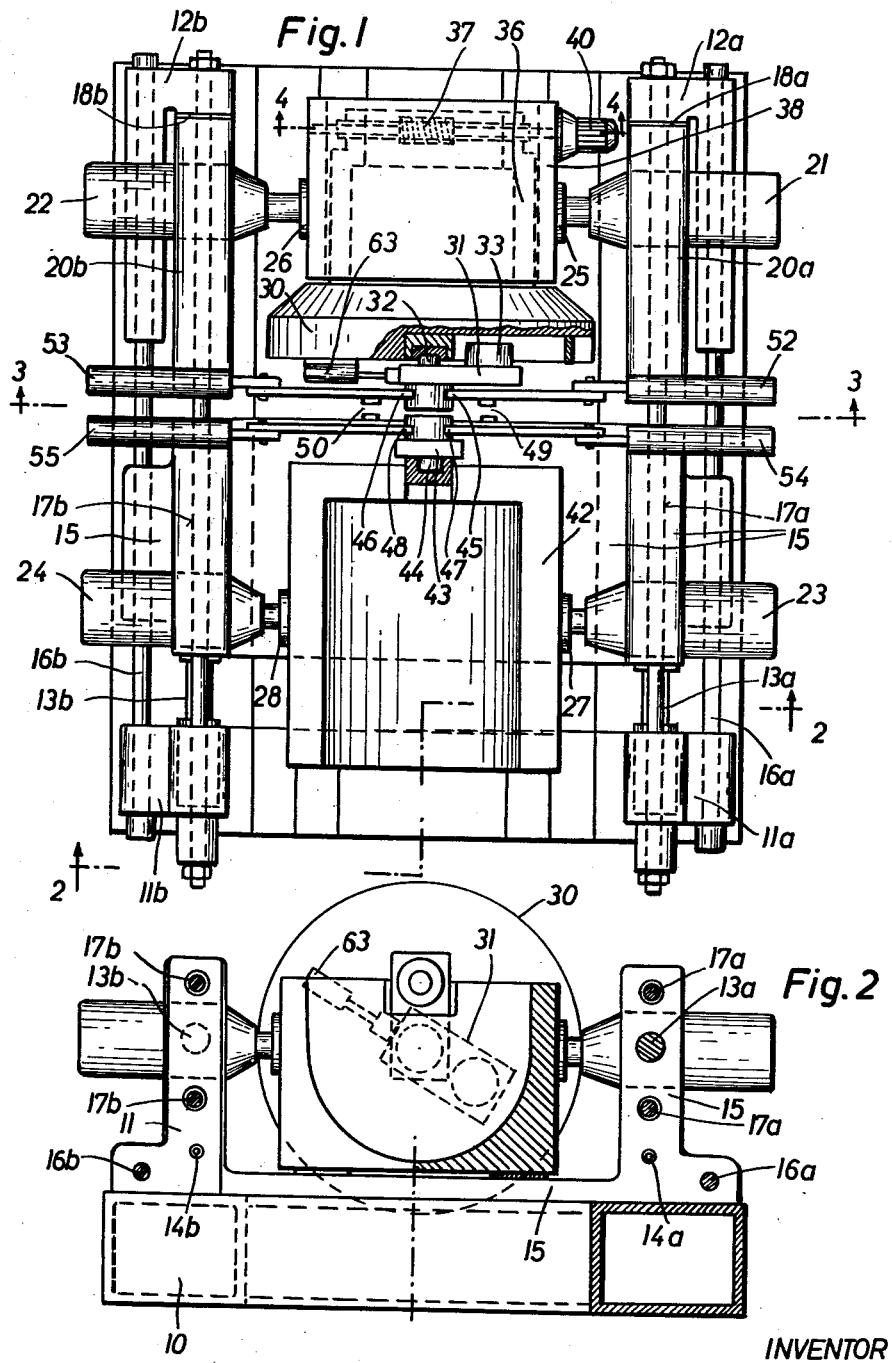
INVENTOR
Eberhard Rietsch
BY
Lowry & Rinehart
ATTYS.

March 5, 1963

E. RIETSCH 3,080,471

ELECTRIC RESISTANCE BUTT WELDING MACHINE

Filed May 24, 1960

3 Sheets-Sheet 2

INVENTOR
Eberhard Rietsch
BY
Lowry & Rinehart
ATTYS.

March 5, 1963   E. RIETSCH   3,080,471
ELECTRIC RESISTANCE BUTT WELDING MACHINE
Filed May 24, 1960   3 Sheets-Sheet 3

INVENTOR
Eberhard Rietsch
BY
Lowry & Rinehart
ATTYS.

United States Patent Office 3,080,471
Patented Mar. 5, 1963

3,080,471
ELECTRIC RESISTANCE BUTT WELDING MACHINE
Eberhard Rietsch, Burscheid, Rhineland, Germany, assignor to Theodor Wupperman G.m.b.H., Leverkusen, Germany
Filed May 24, 1960, Ser. No. 31,424
Claims priority, application Germany May 27, 1959
8 Claims. (Cl. 219—101)

This invention relates to an electric resistance butt welding machine, more particularly a clamping arrangement for the welding of crankshafts, more particularly by the flash-butt method.

The production of crankshafts by casting or as a one-piece forging is sufficiently well known. The production of crankshafts from individual forgings by means of electric resistance flash-butt welding has also been known for a long time. The last-mentioned method, however, in practice is restricted to relatively small and simple shafts since the clamping jaws for relatively large and multi-part crankshafts are very expensive, and also have only a short working life. The difficulties regarding the jaws are due to various causes. If one considers a crankshaft which has been produced by a welding process, it will be apparent that the welds which are necessary comprise welds at the crank pins (big end journals) and welds at the shaft journals (bearing journals). The procedure adopted is that the corresponding half-journals in each case are welded to one another. The welding operation at the crank pins is much smaller, since the adjoining crank webs extend parallel to one another practically in every case. Therefore, the welding work here can always be carried out by means of the same jaws. These jaws for the easily accessible crank pins are of a simple kind. There is a very different state of affairs, however, as regards welding the shaft journals. The webs of the crankshaft are seldom if ever parallel here, but on the contrary form an angle relatively to one another. The webs are turned about the crankshaft axis into offset positions. In a normal six-throw crankshaft, for example, there are webs which are offset from one another by angles of 120° and there are also webs which are in register. It will be readily apparent that different welding jaws are required for the different welding operations which are necessarily entailed. But it is precisely the copper welding jaws which constitute an important factor in the total cost of the welding work. It must also be borne in mind that the jaws are subjected to a great amount of wear owing to their angular stressing. The manufacture of the jaws and subsequent working is also complicated for the same reason. Welding costs are relatively high since even after a few welds a time-wasting conversion of the welding machine is required. The sets of jaws can also be used only for a specific shaft, which leads to the necessity of keeping a large number of sets of jaws in stock, and would only be justified in cases where large numbers of items are being produced, which is not the case with large and complicated shafts.

Therefore, an object of the present invention is to solve the problem of clamping a crankshaft for butt welding in such a manner that it is more economically acceptable to manufacture even very large and complicated crankshafts with any desired number of throws at any desired angles even in single-unit manufacture, by means of electric resistance flash-butt welding. The invention takes into account the fact that three different welding processes are already known, namely welding individual pieces one after the other, secondly first of all welding together all the crank pin halves followed by welding the shaft journal halves, and lastly welding all the shaft journal halves before welding all the crank pin halves.

The invention proceeds, by way of example, from the last-mentioned process.

According to the present invention there is provided a clamping arrangement for a welding machine for the welding of crankshafts, more particularly by the flash-butt welding method, said arrangement comprising at one mounting side an interchangeable, laterally open hollow member, preferably a semi-cylindrical trough-shaped member, which has a central bearing in its end faces for receiving a crankshaft spigot, and at the other side, for welding the shaft journals, an angular positioning device which includes a rotatable mounting plate having a non-axial clamping means for a crank pin. The clamping arrangement according to the invention is preferably so constructed that trough-shaped members are secured against rotation by means of adjustable clamping jaws but are axially displaceable together with adjusting cylinders fixed to the slide of the machine. The angular positioning device is expediently made interchangeable, and the same is true of the trough-shaped members. It is proposed that the non-welded crank pins are adapted to be arranged in the mounting plate of the angular positioning device, namely in a slot-like recess in the plate, with the help of adjustable clamping strips. The clamping arrangement preferably includes a unilaterally open hollow member, more particularly a semi-cylindrical trough-shaped member, which is fixedly mounted and after the welding of the shaft journals replaces the angular positioning device at said one mounting side, for the welding of the crank pins. It order to permit the welding work to be carried out with the requisite accuracy, the stationary trough-shaped member should be provided with a centering pin or the like fixed to its wall and also with laterally acting clamping means for the secure gripping of the crankshaft parts to be welded At that side of the clamping arrangement towards which the crankshaft moves as welding progresses, there may be arranged inside or outside the trough-shaped member bearing brackets which support the crankshaft at the bearings thereof and which are adjustable axially and/or at right angles to the axial direction.

Advantageously, the procedure for welding crankshafts comprising individual pieces each comprising two half-journals carried on crank webs, with the use of a clamping arrangement according to the present invention, is that at first only shaft journal halves are welded by means of welding jaws between the rotatable angular positioning device and the trough-shaped members, and then the angular positioning devices can be replaced by the stationary trough-shaped member and then only crank pin halves are welded, between trough-shaped members. So as to adapt the crankshaft pieces especially to the clamping arrangement, the workpieces are preferably provided with lost centering spigots integral with the piece to be welded, or centering holes at the cheek side remote from the half-journals to be welded in the axial sense.

Figure 4:
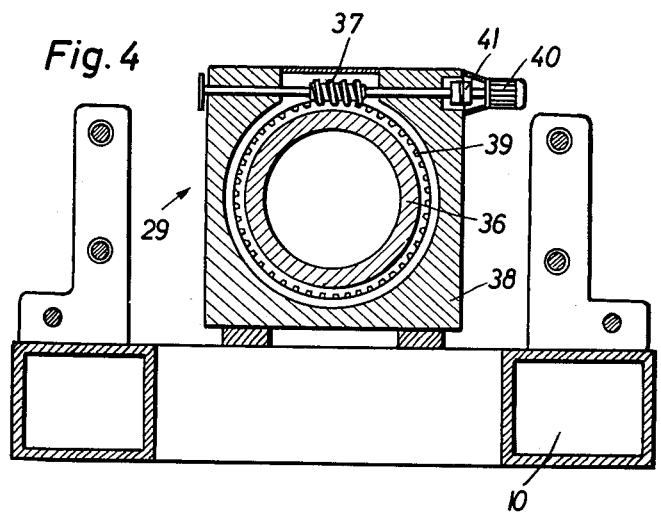
Figure 5:
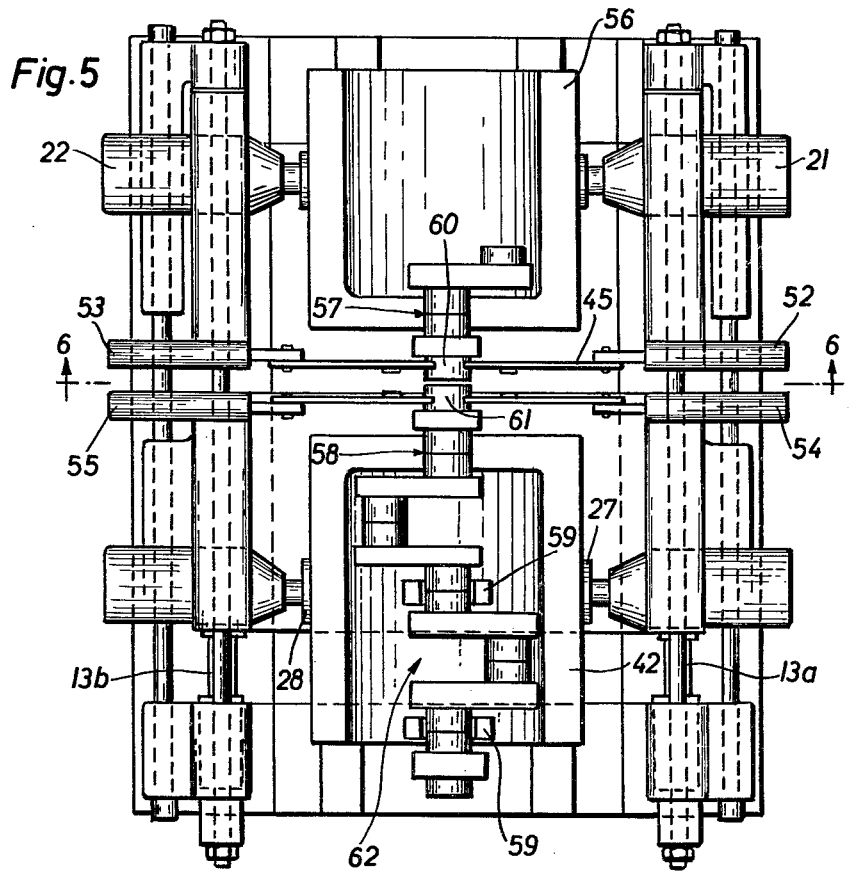
Figure 6:
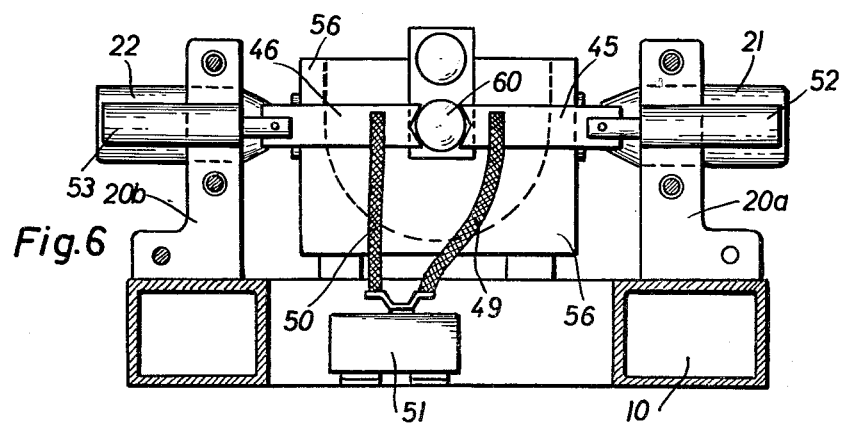

For a better understanding of the invention and to show how the same may be carried into effect, reference will now be made to the accompanying diagrammatic drawings in which:

FIGURE 1 is a plan view of crankshaft welding apparatus according to the invention, for welding the shaft journals, FIGURE 2 is partly a side view and partly a sectional view corresponding to the line 2—2 of FIGURE 1, FIGURE 3 is a sectional view taken on the line 3—3 of FIGURE 1, FIGURE 4 is a sectional view on the line 4—4 of FIGURE 1, FIGURE 5 is a plan view of the apparatus shown in FIGURE 1 after conversion for welding of the crank pins, FIGURE 6 is a sectional view taken on the line 6—6 of FIGURE 5.

The apparatus shown in FIGURES 1-6 comprises a base 10 to the top of which stationary machine stands 11a, 11b and 12a, 12b are secured in spaced-apart relation and by any suitable means. The base 10 is adapted to receive a slide 15 which is movably arranged and is guided with its slower part in guide beams 16a and 16b. The machine stands 11a, 12a and 11b, 12b are connected by draw beams 17a and 17b, which are guided with clearance in all parts i.e. the machine stands, the slide and the supports 20a and 20b secured to the stands 12a, 12b. Isolations 18a, 18b are arranged between the supports 20a, 20b and the stands 12a, 12b. The movement of the displaceable slide 15 in the direction to the stationary stands 12a, 12b is effected by the upsetting stands 13a, 13b and by means of curved members which control the burning-down of the parts to be butt-welded. For the return of the movable slide 15 pull-back cylinders 14a, 14b are provided. The above mentioned principle structure for the butt-welding of the parts to be welded corresponds to the co-pending U.S. application Ser. No. 786,618 filed January 13, 1959, now U.S. Patent No. 2,967,925.

In FIGURE 1, reference numerals 21, 22, 23 and 24 designate clamping elements, e.g. hydraulically operated cylinders or spindle drives. 21 and 22 are fixed to the stationary parts 20a, 20b and 23 and 24 to the movable part (slide 15) of the welding machine. The four cylinders operate four clamping jaws 25, 26, 27, 28. These clamping jaws have only mechanical tasks and are not connected to the actual electric welding circuit of the machine. A rotatable positioning device 29 is clamped between the clamping jaws 25 and 26. This device comprises a rotatable mounting plate 30 which accommodates a left-hand workpiece 31. The latter is centered by means of a contering spigot 32 and is clamped in the conventional manner by means of grooved steel jaws. A crank pin half 33 at the same web side as the centering spigot 32 is mounted between two parallel strips 34 (FIGURE 3) which are adjustable to the actual diameter by the device 35. The mounting plate 30 is rotatably mounted by its quill 36 in the body 38 of the angular positioning device 29 and can be held in any desired angular position by means of a drive device consisting e.g. of worm 37, a worm wheel 39, a clutch 41 and a motor 40.

A trough shaped member 42 is clamped between the clamping jaws 27 and 28 situated on the machine slide 15. A right-hand workpiece 43 is centered and clamped fast thereon by means of its centering spigot 44. The welding current is applied to the workpieces 31 and 43 through electrodes or welding jaws 45, 46, 47 and 48. These welding jaws are connected in known manner by means of flexible conductors to the transformer 51 of the machine, and are pressed against the workpieces 31, 43 by pressure cylinders 52, 53, 54 and 55 in order to make contact. These welding jaws are simple copper blocks without any particular shape, merely with a prismatic recess for matching the round journals. A set of such jaws can be used not only for all the welds required on a shaft but also for shafts of different size and construction.

The first stage of the welding work on a crankshaft is carried out as follows: The machine is opened out to leave an adequate gap between the slide 15 and the stationary part, and the workpieces 31 and 43 i.e. webs each having two journal halves, are placed in their mountings, centered and mechanically clamped in position. Then by operating the turning means (switching on the motor 40) the workpiece 31 is brought into the desired angular position. Then the welding jaws 45 to 48 are applied by bringing into operation the cylinders 52 to 55, the machine is switched on and the welding operation is carried out in known manner. Then after release of the welding jaws and of the centering clamping means, the machine is opened out and the welded piece is removed. When the upset ridges are being machined-off, the centering spigots 32 and 44, which are now no longer necessary, can also be machined-off at the same time. After all the shaft journals of the crankshaft have been welded at the appropriate angles, the machine is then converted for the welding of the crank pins. This conversion is much simpler to effect than a change of jaws such as has been necessary hitherto, since all that is required in the replacement of a single part, namely the angular positioning device 29, which in any case is not bolted-on but is only clamped in the clamping jaws 25, 26.

FIGURES 5 and 6 show the state of the machine after the conversion. The angular positioning device 29 has been taken out, after release of the clamping jaws 25 and 26, and replaced by a second, shorter trough-shaped member 56. In the second working stage which now follows, only crank pins are welded. It is a feature of this stage that the webs are always parallel to one another; therefore, there is no longer any need for a device for turning a workpiece into an angular position. However, there are now at both sides pieces which have been already welded and which can be disposed at any desired angles. Therefore, to the right or left of the welding region sufficient room is left free to receive the pieces disposed at any angle. The trough shape takes into account this requirement. It has a semi-cylindrical recess the radius of which is sufficiently large to accommodate the largest crankshaft with which this trough will have to cope.

Pieces for welding, or workpieces, are then positioned so that one piece is situated in the bearing 57 in the trough-shaped member 56 and the other, matching piece is in the corresponding bearing 58 in the trough-shaped member 42, such that the two adjacent webs are parallel. The bearing regions in the trough-shaped members are expediently of adjustable dimensions. The workpiece is again centered and clamped fast on the wall of the trough-shaped member. The centering can be effected by means of a lost centering spigot, but in many cases it is simpler to provide on the trough wall a centering pin which engages in a centering hole on a crank pin. Crank pins often comprise holes for reducing inertia forces, and these holes can be used for centering purpose. It will be apparent that the crank pin halves can be successively welded together and the crankshaft can therefore always be shifted further into the trough-shaped member 42 at the right-hand side of the clamping arrangement. In order to avoid bending effects or the like in the case of relatively heavy crankshafts, it is possible to provide in the trough-shaped member 42 a bearing bracket 59 or a plurality of such brackets which are axially adjustable and are additionally made adjustable at right angles to the crankshaft axis. These engage about or support one or more shaft bearings, so that the entire crankshaft can be completely or nearly completely relieved of bending stresses. By welding the crank pin halves 60, 61 to the previously welded shaft journal halves (on 31 and 43) the finished crankshaft 62 is obtained.

However, the illustrated clamping arrangement need not be restricted to exclusively interchangeable trough-shaped members. Trough-shaped members 42 can be arranged fixedly on the machine slide, omitting the clamping jaws 27 and 28 and also the driving cylinders 23 and 24. In this event it would be suitable for the series production of identical crankshafts according to the foregoing welding method. The interchangeability of the trough-shaped members 42 has also the advantage that when they are removed from the machine slide the entire machine can be used for any other purpose, i.e. the machining can be a multi-purpose unit.

The supply of welding current to the clamping arrangement is effected through contact jaws which only abut on the journal being welded, whilst at the same time the mechanical fixing, centering and angular adjustment of the piece being welded, and also their support against compressive force, are undertaken by separate mechanical elements which are fixed in a readily interchangeable manner in clamping jaws of the machine.

What is claimed is:

1. A crankshaft welding apparatus for forming a crankshaft from a plurality of crankshaft components of the type including a web having a shaft journal part extending from one side thereof at one end and a crank pin part extending from the opposite side thereof at the opposite end thereof by welding together shaft journal parts and crank pin parts, said apparatus including an elongated frame, first and second opposed set of clamps carried by said frame in longitudinally spaced relation, removable supports for crankshaft components releasably clamped in said frame by said clamps in longitudinally spaced relation, at least one of said supports being of semi-cylindrical trough shape, bearing brackets rising from the bottom of the trough-shaped support providing temporary bearings for aligned and welded crankshaft components, and pairs of opposed shaft journal and crank pin engageable electrodes carried by said frame in longitudinally spaced relation intermediate said supports.

2. A crankshaft welding apparatus for forming a crankshaft from a plurality of crankshaft components of the type including a web having a shaft journal part extending from one side thereof at one end and a crank pin part extending from the opposite side thereof at the opposite end thereof by welding together shaft journal parts and crank pin parts, said apparatus including an elongated frame, first and second opposed set of clamps carried by said frame in longitudinally spaced relation removable supports for crankshaft components releasably clamped in said frame by said clamps in longitudinally spaced relation, and pairs of opposed shaft journal and crank pin engageable electrodes carried by said frame in longitudinally spaced relation intermediate said supports, one of said supports including means for clamping a first crankshaft component in a fixed position, and the other of said support including a rotatable clamp for clamping a second crankshaft component in angular relation to the first crankshaft component with the shaft journal parts of the two crankshaft components in opposed aligned relation.

3. The crankshaft welding apparatus of claim 1 wherein each of said electrodes includes a V-shaped end portion for receiving shafts of different diameters.

4. The crankshaft welding apparatus of claim 1 wherein each of said electrodes includes a transversely extensible clamp member for clamping each electrode against a respective shaft part.

5. The crankshaft welding apparatus of claim 1 wherein each of said electrodes includes a V-shaped end portion for receiving shafts of different diameters, and a transversely extensible clamp member for clamping each electrode against a respective shaft part.

6. The crankshaft welding apparatus of claim 1 wherein each of said supports includes at least one seat for receiving a welded shaft journal to support welded together crankshaft components with crank pin parts in alignment.

7. The crankshaft welding apparatus of claim 1 wherein one pair of said clamps has adjustable mounting means for movement longitudinally of said frame together with the one of said supports clamped therebetween to bring shaft journal parts and crank pin parts into abutting engagement.

8. The crankshaft welding apparatus of claim 7 wherein one pair of said electrodes is mounted on said adjustable mounting means for movement therewith.

References Cited in the file of this patent

UNITED STATES PATENTS

| | | |
|---|---|---|
| 1,180,096 | Woodrow et al. | Apr. 18, 1916 |
| 1,731,541 | Powell | Oct. 15, 1929 |
| 1,922,424 | Evans | Aug. 15, 1933 |
| 2,354,267 | Lytle et al. | July 25, 1944 |
| 2,677,746 | Duch et al. | May 4, 1954 |
| 2,897,339 | Schlatter | July 28, 1959 |

FOREIGN PATENTS

| | | |
|---|---|---|
| 200,594 | Great Britain | July 18, 1923 |

UNITED STATES PATENT OFFICE
CERTIFICATE OF CORRECTION

Patent No. 3,080,471                        March 5, 1963

Eberhard Rietsch

It is hereby certified that error appears in the above numbered patent requiring correction and that the said Letters Patent should read as corrected below.

In the grant, lines 2 and 12 and in the heading to the printed specification, line 5, name of assignee, for "Theodor Wupperman G.m.b.H.", each occurrence, read -- Theodor Wuppermann G.m.b.H. --.

Signed and sealed this 21st day of May 1963.

(SEAL)
Attest:

ERNEST W. SWIDER                        DAVID L. LADD
Attesting Officer                          Commissioner of Patents